(12) United States Patent
Maltz et al.

(10) Patent No.: US 12,496,034 B2
(45) Date of Patent: Dec. 16, 2025

(54) SYSTEMS AND METHODS FOR PATIENT MONITORING

(71) Applicant: SHANGHAI UNITED IMAGING HEALTHCARE CO., LTD., Shanghai (CN)

(72) Inventors: Jonathan Maltz, Houston, TX (US); Johannes Stahl, Houston, TX (US)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 208 days.

(21) Appl. No.: 18/058,854

(22) Filed: Nov. 25, 2022

(65) Prior Publication Data
US 2023/0091955 A1 Mar. 23, 2023

Related U.S. Application Data

(63) Continuation of application No. PCT/CN2020/092749, filed on May 28, 2020.

(51) Int. Cl.
*G16H 40/67* (2018.01)
*A61B 6/00* (2006.01)
(Continued)

(52) U.S. Cl.
CPC .............. *A61B 6/541* (2013.01); *A61B 8/543* (2013.01); *G01R 33/5673* (2013.01); *G16H 40/67* (2018.01); *A61B 5/7292* (2013.01)

(58) Field of Classification Search
CPC ....... A61B 6/541; A61B 8/543; A61B 5/7292; A61B 5/7285; A61B 5/0816;
(Continued)

(56) References Cited

U.S. PATENT DOCUMENTS

| 7,393,329 B1 | 7/2008 | Wong et al. |
| 2007/0172029 A1* | 7/2007 | Felmlee ............... A61B 5/1135 |
| | | 600/538 |

(Continued)

FOREIGN PATENT DOCUMENTS

| CN | 104258507 A | 1/2015 |
| CN | 104739510 A | 7/2015 |

(Continued)

OTHER PUBLICATIONS

Yi, Bixing et al., The Study of Scanning Techniques of Thoracic Spiral CT in Patients with Bad Breath, Chinese Journal of CT and MR, 3: 102-104, 2012.

(Continued)

*Primary Examiner* — Christopher Koharski
*Assistant Examiner* — Steven Maldonado
(74) *Attorney, Agent, or Firm* — METIS IP LLC

(57) ABSTRACT

The present disclosure provides a system for patient monitoring. The system may cause a medical device to perform a treatment or a scan on a patient who remains in a breath-hold status. During the treatment or the scan of the patient, the system may acquire one or more parameter values relating to one or more status parameters that reflect the breath-hold status of the patient using a monitoring device. The system may also predict a breaking point of the breath-hold status based on the one or more parameter value. The system may further adjust the treatment or the scan based on the breaking point of the breath-hold status.

18 Claims, 6 Drawing Sheets

(51) Int. Cl.
*A61B 8/00* (2006.01)
*G01R 33/567* (2006.01)
*A61B 5/00* (2006.01)

(58) Field of Classification Search
CPC ..... A61B 5/0823; A61B 5/1135; A61B 6/527; G01R 33/5673; G16H 40/67; A61N 5/1067; A61N 5/1068; A61N 5/1049
See application file for complete search history.

(56) References Cited

U.S. PATENT DOCUMENTS

| | | | |
|---|---|---|---|
| 2015/0119696 A1* | 4/2015 | de Oliveira | A61B 5/113 600/413 |
| 2015/0320342 A1* | 11/2015 | Biber | A61B 5/055 600/411 |
| 2017/0251949 A1 | 9/2017 | Carinci et al. | |
| 2017/0258360 A1 | 9/2017 | Usch | |
| 2018/0116586 A1* | 5/2018 | Thompson | A61B 5/6823 |
| 2019/0374168 A1 | 12/2019 | Grodzki et al. | |
| 2020/0038689 A1 | 2/2020 | Machmer et al. | |
| 2020/0046302 A1* | 2/2020 | Jacquel | A61B 5/0077 |
| 2020/0230439 A1* | 7/2020 | Liu | A61N 5/1037 |
| 2021/0128076 A1* | 5/2021 | Shi | A61B 5/0245 |

FOREIGN PATENT DOCUMENTS

| | | |
|---|---|---|
| CN | 106419918 A | 2/2017 |
| CN | 106859678 A | 6/2017 |
| CN | 107049489 A | 8/2017 |
| CN | 110974244 A | 4/2020 |
| CN | 111067557 A | 4/2020 |
| RU | 2161476 C2 | 1/2001 |

OTHER PUBLICATIONS

Emilio Agostoni, Diaphragm Activity during Breath Holding: Factors Related to Its Onset, J. Appl. Physiol., 1963, 7 pages.
Gerardo Bosco et al., Arterial Blood Gas Analysis in Breath-Hold Divers at Depth, Frontiers in Physiology, 2018, 7 pages.
C. A. Diaz-Botia et al., A Silicon Carbide Array for Electrocorticography and Peripheral Nerve Recording, Journal of Neural Engineering, 2017, 11 pages.
H. R. Harty et al., Ventilatory Relief of the Sensation of the Urge to Breathe in Humans: Are Pulmonary Receptors Important?, Journal of Physiology, 805-815, 1996.
E. J. W. Maarsingh et al., Respiratory Muscle Activity Measured with a Noninvasive EMG Technique: Technical Aspects and Reproducibility, J. Appl. Physiol., 88: 1955-1961, 2000.
Michael J. Parkes et al., Safely Prolonging Single Breath-Holds to >5 Min in Patients with Cancer; Feasibility and Applications for Radiotherapy, Br. J. Radiol., 2016, 9 pages.
T. D. Poeppel et al., Cerebral Haemodynamics during Hypo- and Hypercapnia: Determination with Simultaneous 150-Butanol-PET and Transcranial Doppler Sonography, Nuklearmedizin, 46(3): 93-100, 2007.
Peter B.Saadeh et al., Needle Electromyography of the Diaphragm: a New Technique, Muscle & Nerve, 16(1): 15-20, 1993.
P. Symonds et al., Flash Radiotherapy: the Next Technological Advance in Radiation Therapy?, Clinical Oncology, 31: 405-406, 2019.
Jasper Verbree et al., Assessment of Middle Cerebral Artery Diameter during Hypocapnia and Hypercapnia in Humans Using Ultra-High-Field MRI, J. Appl. Physiol., 117: 1084-1089, 2014.
International Search Report in PCT/CN2020/092749 mailed on Feb. 24, 2021, 7 pages.
Written Opinion in PCT/CN2020/092749 mailed on Feb. 24, 2021, 5 pages.

* cited by examiner

500

```
Acquiring, using a monitoring device, one or more parameter      501
values relating to one or more parameters that reflect a
breath-hold status of the patient
           │
           ▼
Predicting, based on the one or more parameter values, a         502
breaking point of the breath-hold status
           │
           ▼
Adjusting, based on the breaking point of the breath-hold        503
status, the treatment or the scan of the patient
```

| Status Parameters | Detected Organ/Tissue | Components of Monitoring Device |
|---|---|---|
| Motion of ROI | ROI (e.g., diaphragm intercostal muscle, abdominal muscle, or glottis) | Imaging device, EMG electrode |
| Motion of leading region | Leading region | Respiratory sensor, optical device, EMG electrode |
| Lung volume | Body surface | Distance measurement device |
| Respiration motion | Mouth or nose | Respiration detection device |
| Intrathoracic pressure | Esophagus | Pressure measurement device |
| Afferent activity | Vagal nerve or phrenic nerve | Nerve monitoring device |
| Blood gas level | Arterial blood | Arterial blood sampling device |
| Hypercapnia level | Brain (e.g., MCA) | Brain blood volume measurement device |
| Heart rate | / | Heart rate measurement device |
| Blood pressure | / | Blood pressure measurement device |

FIG. 6

SYSTEMS AND METHODS FOR PATIENT MONITORING

CROSS-REFERENCE TO RELATED APPLICATIONS

This application is a continuation of International Application PCT/CN2020/092749, filed on May 28, 2020, the contents of which are hereby incorporated by reference.

TECHNICAL FIELD

The present disclosure generally relates to patient monitoring in medical imaging and/or treatment, and more particularly, methods and systems for monitoring a breath-hold status of a patient in the medical imaging and/or treatment.

BACKGROUND

Medical imaging and radiation therapy are widely used in disease diagnosis and/or treatment. A patient (or another subject) may be scanned by an imaging device to acquire image data of the patient for analysis, and/or treated by a treatment device.

SUMMARY

According to one aspect of the present disclosure, a system for patient monitoring is provided. The system may include at least one storage device comprising a set of instructions, and at least one processor configured to communicate with the at least one storage device. When executing the set of instructions, the at least one processor may be configured to direct the system to perform operations. The at least one processor may be configured to direct the system to cause a medical device to perform a treatment or a scan on a patient who remains in a breath-hold status. During the treatment or the scan of the patient, the at least one processor may be configured to direct the system to acquire one or more parameter values relating to one or more status parameters that reflect the breath-hold status of the patient using a monitoring device. The at least one processor may also be configured to direct the system to predict a breaking point of the breath-hold status based on the one or more parameter values. The at least one processor may further be configured to direct the system to adjust the treatment or the scan based on the breaking point of the breath-hold status.

In some embodiments, the at least one processor may be configured to direct the system to obtain experimental data relating to one or more test breath-holds of the patient. The at least one processor may also be configured to direct the system to determine the one or more status parameters based on the experimental data.

In some embodiments, the experimental data may include motion data of a body surface of the patient. The at least one processor may be configured to direct the system to determine one or more leading regions associated with the breaking point based on the motion data of the body surface of the patient. The at least one processor may also be configured to direct the system to determine the one or more status parameters based at least partially on the one or more leading regions. At least one of the one or more status parameters may relate to a motion of the one or more leading regions.

In some embodiments, the monitoring device may include at least one of a respiratory sensor, an optical device, a radar device, or an electromyography (EMG) electrode, configured to monitor the motion of the one or more leading regions.

In some embodiments, to adjust the treatment or the scan based on the breaking point of the breath-hold status, the at least one processor may be configured to direct the system to determine an interruption time point to interrupt the treatment or the scan based on the breaking point, and cause the medical device to interrupt the treatment or the scan at the interruption time point.

In some embodiments, at least one of the one or more parameter values may relate to a motion of a region of interest (ROI) of the patient. The ROI may be associated with a respiration motion of the patient. The at least one processor may be configured to direct the system to determine whether the ROI has a rhythmic motion or a gross motion based on the at least one parameter value relating to the motion of the ROI of the patient. The at least one processor may also be configured to direct the system to predict the breaking point based on a determination result as to whether the ROI has a rhythmic motion or a gross motion.

In some embodiments, the ROI of the patient may include at least one of the diaphragm, an intercostal muscle, an abdominal muscle, an accessory breathing muscle, an expiration muscle, or the glottis of the patient.

In some embodiments, the monitoring device may include an imaging device configured to capture one or more images of the ROI.

In some embodiments, the imaging device may include at least one of an electrical impedance tomography (EIT) electrode, an ultrasonic transducer, a cine x-ray system, a magnetic resonance imaging (MRI) device, a positron emission tomography (PET) device, or a single photon emission computerized tomography (SPECT) device.

In some embodiments, the monitoring device may include an EMG electrode configured to measure an EMG of the ROI.

In some embodiments, the monitoring device may include a distance measurement device configured to measure a distance between the distance measurement device and a body surface of the patient. To acquire one or more parameter values relating to one or more status parameters that reflect the breath-hold status of the patient, the at least one processor may be configured to direct the system to acquire the distance between the distance measurement device and the body surface of the patient using the distance measurement device. The at least one processor may be configured to direct the system to estimate the one or more parameter values based at least partially on the distance. At least one of the one or more parameter values may relate to a lung volume of the patient.

In some embodiments, the distance measurement device may include at least one of an optical sensor, an ultrasound sensor, a radar sensor, a time-of-flight sensor, a structured light-based sensor, or a marker-based sensor.

In some embodiments, the monitoring device may include a respiration detection device configured to monitor a respiration motion of the patient.

In some embodiments, the respiration detection device may include a closed tube equipped with a pressure sensor, the closed tube being operably coupled to at least one of the mouth or the nose of the patient.

In some embodiments, at least one of the one or more parameter values may relate to an intrathoracic pressure of the patient, and the monitoring device may include a pressure measurement device configured to measure the intrathoracic pressure of the patient.

In some embodiment, the pressure measurement device may include a pressure sensor mounted on an esophageal balloon. The esophageal balloon may be placed in the esophagus of the patient.

In some embodiments, at least one of the one or more parameter values may relate to an afferent activity in one or more nerves associated with a respiration motion of the patient. The monitoring device may include a nerve monitoring device configured to monitor the afferent activity.

In some embodiments, at least one of the one or more parameter values may relate to a blood gas level of the patient, and the monitoring device may include an arterial blood sampling device configured to sample blood from the patient.

In some embodiments, at least one of the one or more parameter values may relate to a hypercapnia level of the patient. The monitoring device may include a brain blood volume measurement device. To acquire one or more parameter values relating to one or more status parameters that reflect the breath-hold status of the patient, the at least one processor may be configured to direct the system to acquire a brain blood volume of the patient using the brain blood volume measurement device, and estimate the at least one parameter value relating to the hypercapnia level of the patient based on the brain blood volume of the patient.

In some embodiments, at least one of the one or more parameter values may relate to a heart rate of the patient, and the monitoring device may include a heart rate measurement device.

In some embodiments, at least one of the one or more parameter values may relate to a blood pressure of the patient, and the monitoring device may include a blood pressure measurement device.

According to another aspect of the present disclosure, a method for patient monitoring is provided. The method may include causing a medical device to perform a treatment or a scan on a patient who remains in a breath-hold status. During the treatment or the scan of the patient, the method may include acquiring one or more parameter values relating to one or more status parameters that reflect the breath-hold status of the patient using a monitoring device. The method may also include predicting a breaking point of the breath-hold status based on the one or more parameter values. The method may further include adjusting the treatment or the scan based on the breaking point of the breath-hold status.

According to another aspect of the present disclosure, a non-transitory computer-readable storage medium including instructions is provided. When accessed by at least one processor of system for patient monitoring, the instructions may cause the system to perform a method. The method may include causing a medical device to perform a treatment or a scan on a patient who remains in a breath-hold status. During the treatment or the scan of the patient, the method may include acquiring one or more parameter values relating to one or more status parameters that reflect the breath-hold status of the patient using a monitoring device. The method may also include predicting a breaking point of the breath-hold status based on the one or more parameter values. The method may further include adjusting the treatment or the scan based on the breaking point of the breath-hold status.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for monitoring a breath-hold status of a patient according to some embodiments of the present disclosure; and FIG. 6 illustrates a table of exemplary status parameters of a patient and exemplary components of a monitoring device according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Figure 2:
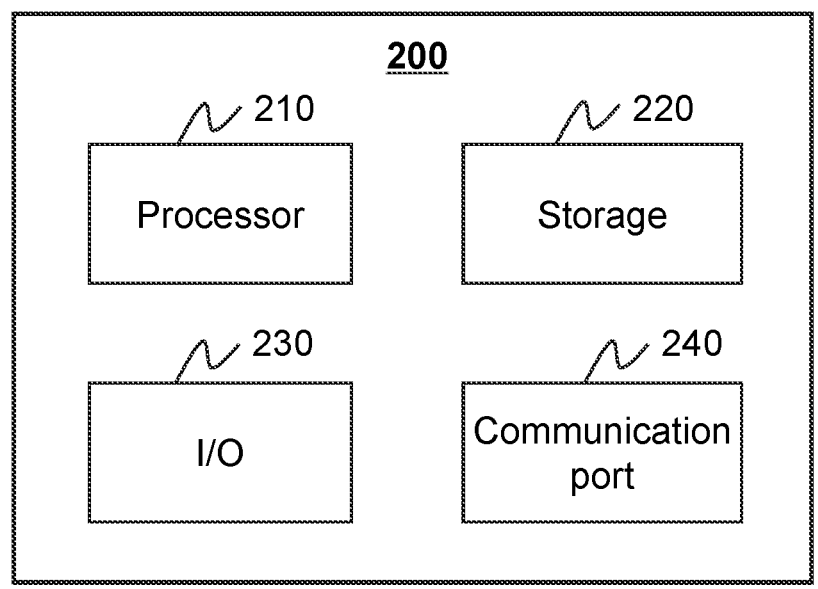
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

A medical procedure, e.g., medical imaging, radiation therapy, etc., often involves motion management. For example, during an imaging scan (or referred to as scan herein for brevity) of a patient, a region of the patient may move due to a respiration motion of the patient, which may affect the quality of a resulting image (e.g., causing a motion artifact in the resulting image). During a treatment of the patient, a treatment device may emit radiation toward a target (e.g., a tumor) of the patient according to a treatment plan. The target may undergo a motion due to, e.g., the respiratory motion, which may cause that the radiation is delivered to a region out of the target. In order to eliminate or reduce the effect of the respiration motion of the patient, the patient may be asked to hold his/her breath during the scan or the treatment. However, the patient may unexpectedly interrupt breath-hold, which may adversely affect the medical procedure, by bringing about motion artifact in the imaging data acquired in an imaging process, or leading to a dosing error in the treatment process, etc. Correction measures may need to be performed by, e.g., repeating at least a portion of the medical procedure, employing a motion correction algorithm in image processing, or the like, or a combination thereof. Such correction measures may involve, e.g., additional time to complete the medical procedure for the patient, relevant healthcare provider(s) and/or equipment (e.g., the imaging device(s), the treatment device(s), and/or the processing device(s) involved in the medical procedure, extra doses of radiation the patient is subjected to, or the like, or a combination thereof. Therefore, it is desirable to provide systems and methods for monitoring a breath-hold status of a patient in a medical procedure, e.g., imaging, radiation therapy, etc., thereby improving the efficiency, accuracy, and/or efficacy of the imaging and/or treatment.

Provided herein are systems and components for non-invasive biomedical imaging and/or treatment, such as for disease diagnostic or research purposes. In some embodiments, a medical device may be directed to perform a treatment and/or a scan on a subject. For illustration purposes, the present disclosure takes a patient as an exemplary subject, and this is not indented to be limiting. For example, the medical device may include an imaging device configured to perform a scan on the patient. During the scan, one or more regions of the patient may move due to a respiration motion of the patient, which may affect the quality of a resulting image (e.g., causing a motion artifact in the resulting image).

As another example, the medical device may include a treatment device (e.g., a radiotherapy device) configured to perform a treatment on the patient. During the treatment, the medical device may emit radiation toward a target of the patient (e.g., a certain anatomical structure that needs to be tracked and/or monitored during the treatment). For example, the target may be a tumor, an organ with a tumor, a tissue with a tumor, or any combination thereof, that needs to be imaged and/or treated. In some cases, the target and/or one or more organs-at-risk (OARs) may undergo a motion due to a respiration motion of the patient. For example, due to the respiration motion of the patient, the radiation may be delivered to an OAR, such as an organ and/or a tissue that are close to the target and not intended to be subjected to radiation, but under the risk of radiation damage due to its proximity to the target.

In order to eliminate or reduce the effect of the respiration motion, a motion management technique may be used in the treatment and/or the scan of the patient. Taking the treatment as an example, the motion management technique may be used to ensure that the radiation delivered to the patient match a planned dose distribution as closely as possible in the presence of the motion of the target and/or the OAR(s). Exemplary motion management techniques used in the treatment may include an image guide radiation therapy (IGRT) technique, a breath-hold technique, or the like, or any combination thereof. The IGRT technique may be used to adjust the patient position before and/or during treatment to ensure the target is within a delivered treatment field. However, the IGRT may only adjust the patient position as a whole without accounting for an internal movement of organs relative to each other. A treatment plan may need to be adapted to conform to the target as presented during the time of treatment.

A breath-hold technique has been used in imaging procedures and treatment procedures. For example, during a treatment and/or a scan of the patient, the patient may be asked to hold his/her breath, so that the respiratory motion may be greatly reduced. This may improve the imaging quality in imaging procedures, and the precision of the radiation delivery to the target during treatment procedures. Compared with other motion management techniques (e.g., managing the respiration motion by tracking a position of respiratory organ(s) of the patient), the breath-hold technique may be less subject to an uncertainty of prediction, and/or an assumption that successive breathing cycles have a uniform length. For example, if the patient is imaged at a certain breath-hold level before or during treatment, whether a target and an OAR of the patient are in their respective planned positions may be assessed (perhaps after the breath-hold level, the patient position, and/or the treatment plan are adjusted). The certain breath-hold level may be reliably maintained, and a high level of confidence may be placed in an accurate plan delivery.

In applying the breath-hold technique, one or more problems may need to be addressed. On the one hand, the patient may unexpectedly interrupt a breath-hold status (e.g., taking a breath or cough), which may affect an imaging process or lead to a dosing error in a treatment process if this condition is not promptly detected. For example, in a hypofractioned therapy, an ablative therapy, or a flash radiotherapy, an unexpected interruption of the breath-hold status may be likely to cause harm to the patient. Merely by way of example, in a radiotherapy with an output of 2400 MU/min, a 200 milliseconds delay between a time point of detecting a cough or a failed breath-hold status and a time point of turning off the beam may lead to 8 MU of additional radiation output. In a flash radiotherapy with an output rate of 40 Gy/s, the additional radiation output may be equal to 8 Gy, which may lead to a serious radiation injury to an OAR. On the other hand, different patients may have different breath-hold capabilities. The problems need to be solved may include, for example, how to predict that a patient may need to take a breath soon or cough, how to adjust a scan or treatment according to the prediction result, and for a continuous delivery such as an arc therapy, how to reduce a resumption time by restoring a gantry/collimation system of the medical device to a position suitable for resumption, or the like, or any combination thereof.

However, conventional breath-hold techniques may use a predefined breath-hold duration (e.g., 20 s), regardless of a breath-hold capability that varies widely between different patients and even within the same patient. Additionally or alternatively, the conventional breath-hold techniques may usually detect a cessation of the breath-hold status of the patient by detecting a surface motion of the patient only after the surface motion occurs. For example, an optical system (e.g., an AlignRT system) may be used to detect the surface motion of the patient. As another example, a respiration belt and/or an optical marker (e.g., a Varian Real-Time Position Management (RPM) system) may be used to detect the surface motion of the patient. If the surface motion is detected, the unexpected change in breath-hold status may be detected, and the beam may be turned off to reduce a dose error. Some other conventional breath-hold techniques may attempt to prolong a breath-hold duration of the patient. For example, the patient may be forced to remain in the breath-hold status by using a breathing tube with a valve. As another example, the breath-hold duration may be prolonged (for example, to greater than 5 minutes) by $O_2$-supplemented air and/or mechanically-induced hypocapnia. These conventional breath-hold techniques may not seek to predict that breath-hold status will soon cease, or determine the patient's urgency to breathe. In addition, the patient may cough during the treatment and/or the scan, which may interrupt the breath-hold status of the patient. The conventional breath-hold techniques may not seek to determine whether the patient is likely to cough.

To address the above-mentioned problems of conventional breath-hold techniques, the present disclosure provides systems and methods for monitoring a breath-hold status of a patient. The systems and methods may cause a medical device to perform a treatment or a scan on the patient who remains in a breath-hold status. During the treatment or the scan of the patient, the systems and methods may acquire one or more parameter values relating to one or more status parameters that reflect the breath-hold status of the patient using a monitoring device. The systems and methods may also predict a breaking point of the breath-hold status based on the one or more parameter values, and further adjust the treatment or the scan based on the breaking point of the breath-hold status. The breaking point refers to a predicted time point at which the patient may cease the breath-hold status and, e.g., take a breath or cough.

In this way, a cessation of the breath-hold status of the patient may be predicted in advance, instead of after it occurs, which may more efficiently eliminate or reduce the effect of the cessation of the breath-hold status. In addition, in some embodiments, because that different patients may have different physiological characteristics (e.g., different breath-hold capabilities), the status parameter(s) of the patient used to predict the breaking point may be selected based on one or more test breath-holds of the patient. This may improve the accuracy of the prediction of the breaking point, which in turn the accuracy of the treatment and/or the scan.

Figure 1:
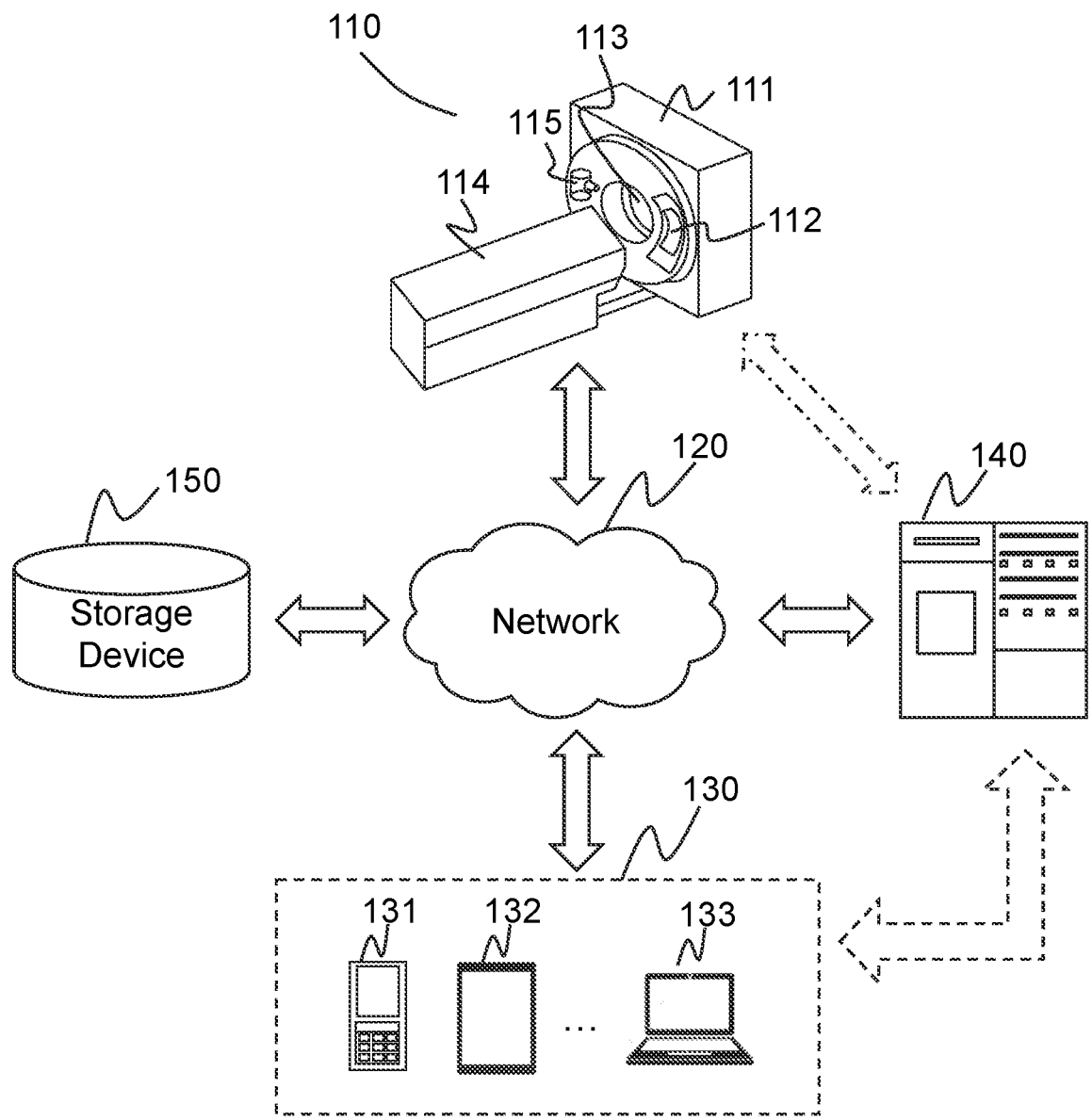
FIG. 1 is a schematic diagram illustrating an exemplary medical system according to some embodiments of the present disclosure.

FIG. 1 is a schematic diagram illustrating an exemplary medical system 100 according to some embodiments of the present disclosure. As shown, the medical system 100 may include a medical device 110, a network 120, one or more terminals 130, a processing device 140, and a storage device 150. In some embodiments, the medical device 110, the terminal(s) 130, the processing device 140, and/or the storage device 150 may be connected to and/or communicate with each other via a wireless connection (e.g., the network 120), a wired connection, or a combination thereof. The connection between the components of the medical system 100 may be variable. Merely by way of example, the medical device 110 may be connected to the processing device 140 directly or through the network 120. As another example, the storage device 150 may be connected to the processing device 140 through the network 120 or directly.

The medical device 110 may include an imaging device and/or a treatment device. The imaging device may generate or provide image data related to a subject via scanning the subject. In some embodiments, the subject may include a biological subject (e.g., a patient) and/or a non-biological subject. For example, the subject may include a specific portion of a body, such as the head, the thorax, the abdomen, or the like, or a combination thereof, of the subject. In some embodiments, the imaging device may be a non-invasive biomedical imaging device for disease diagnostic or research purposes. The imaging device may include a single modality scanner and/or a multi-modality scanner. The single modality scanner may include, for example, an ultrasound scanner, an X-ray scanner, an computed tomography (CT) scanner, a magnetic resonance imaging (MRI) scanner, an ultrasonography scanner, a positron emission tomography (PET) scanner, an optical coherence tomography (OCT) scanner, an ultrasound (US) scanner, an intravascular ultrasound (IVUS) scanner, a near infrared spectroscopy (NIRS) scanner, a far infrared (FIR) scanner, or the like, or any combination thereof. The multi-modality scanner may include, for example, an X-ray imaging-magnetic resonance imaging (X-ray-MRI) scanner, a positron emission tomography-X-ray imaging (PET-X-ray) scanner, a single photon emission computed tomography-magnetic resonance imaging (SPECT-MRI) scanner, a positron emission tomography-computed tomography (PET-CT) scanner, a C-arm scanner, a digital subtraction angiography-magnetic resonance imaging (DSA-MRI) scanner, etc.

It should be noted that the imaging device described above is merely provided for illustration purposes, and not intended to limit the scope of the present disclosure. The term "imaging modality" or "modality" as used herein broadly refers to an imaging method or technology that gathers, generates, processes, and/or analyzes imaging information of a subject. In some embodiments, the image data relating to the subject may include projection data, one or more images of the subject, etc. The projection data may include raw data generated by the imaging device by scanning the subject and/or data generated by a forward projection on an image of the subject.

The treatment device may be configured to deliver a radiotherapy treatment to the subject. For example, the treatment device may deliver one or more radiation beams to a treatment region (e.g., a tumor) of a subject for causing an alleviation of the subject's symptom. A radiation beam may include a plurality of radiation beam lets. In some embodiments, the treatment device may be a conformal radiation therapy device, an image-guided radiation therapy (IGRT) device, an intensity-modulated radiation therapy (IMRT) device, an intensity-modulated arc therapy (IMAT) device, an emission guided radiation therapy (EGRT), or the like.

In some embodiments, the medical device 110 may include a gantry 111, a detector 112, a detecting region 113, a table 114, and a radiation source 115. The gantry 111 may support the detector 112 and the radiation source 115. The subject may be placed on the table 114 for imaging or treatment. In some embodiments, the radiation source 115 may include an imaging radiation source and/or a treatment radiation source. The imaging radiation source may emit radioactive rays to the subject. The radioactive rays may include a particle ray, a photon ray, or the like, or a combination thereof. In some embodiments, the r radioactive rays may include a plurality of radiation particles (e.g., neutrons, protons, electron, μ-mesons, heavy ions), a plurality of radiation photons (e.g., X-ray, a γ-ray, ultraviolet, laser), or the like, or a combination thereof. The detector 112 may detect radiations and/or radiation events (e.g., gamma photons) emitted from the detecting region 113. In some embodiments, the detector 112 may include a plurality of detector units. The detector units may include a scintillation detector (e.g., a cesium iodide detector) or a gas detector. The detector unit may be a single-row detector or a multi-rows detector. The treatment radiation source may be configured to emit treatment radiations towards the subject. In some embodiments, the treatment radiation source may include a linear accelerator (LINAC).

It should be noted that the descriptions regarding the medical device 110 are merely provided for the purposes of illustration, and not intended to limit the scope of the present disclosure. The medical device 110 may include one or more additional components and/or one or more components of the medical device 110 may be omitted. For example, the medical device 110 may include an imaging component for scanning the subject and a treatment component for treating the subject, which may share a same gantry or have their respective gantries. As another example, the medical device 110 may be a treatment device and the detector 112 may be omitted.

In some embodiments, when the medical device 110 performs a scan and/or a treatment on the subject, the subject may need to remain in a breath-hold status to reduce a respiration motion of the subject. The medical system 100 may include a monitoring device configured to monitor the breath-hold status of the subject during the scan and/or the treatment. For example, during the scan and/or the treatment, the monitoring device may acquire one or more parameter values relating to one or more status parameters that reflect the breath-hold status of the subject. The parameter value(s) may be used to detect a cessation of the breath-hold status, for example, predict a breaking point when the subject is likely to stop the breath-hold status. More descriptions regarding the monitoring device and the acquisition of the parameter value(s) may be found elsewhere in the present disclosure. See, e.g., FIGS. 5 and 6, and relevant descriptions thereof.

In some embodiments, one or more approaches to increase the breath-hold duration of the subject may be adopted. For example, the breath-hold duration may be prolonged by increasing an inhaled volume of the subject. As another example, the breath-hold duration may be prolonged by ventilating the subject with air with an enhanced $O_2$ concentration (safely up to 60%). As yet another example, the breath-hold duration may be prolonged by mechanically-hyperventilating the subject to induce the hypocapnia. As still another example, the breath-hold duration may be prolonged by distracting the patient, for example, via asking the patient to perform a mental arithmetic (i.e., a mental calculation).

The network 120 may include any suitable network that can facilitate the exchange of information and/or data for the medical system 100. In some embodiments, one or more components of the medical system 100 (e.g., the medical device 110, the processing device 140, the storage device 150, the terminal(s) 130) may communicate information and/or data with one or more other components of the medical system 100 via the network 120. For example, the processing device 140 may obtain image data from the medical device 110 via the network 120. As another example, the processing device 140 may obtain user instruction(s) from the terminal(s) 130 via the network 120.

The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the medical system 100 may be connected to the network 120 to exchange data and/or information.

The terminal(s) 130 may be connected to and/or communicate with the medical device 110, the processing device 140, and/or the storage device 150. For example, the terminal(s) 130 may display a predicted or actual breaking point of a breath-hold status of a subject to a user (e.g., a doctor). In some embodiments, the terminal(s) 130 may include a mobile device 131, a tablet computer 132, a laptop computer 133, or the like, or any combination thereof. For example, the mobile device 131 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 130 may include an input device, an output device, etc. In some embodiments, the terminal(s) 130 may be part of the processing device 140.

The processing device 140 may process data and/or information obtained from the medical device 110, the storage device 150, the terminal(s) 130, or other components of the medical system 100. In some embodiments, the processing device 140 may be a single server or a server group. The server group may be centralized or distributed. For example, during a scan and/or treatment on the subject performed by the medical device 110, the processing device 140 may obtain one or more parameter values relating to one or more status parameters that reflect the breath-hold status of the subject from a monitoring device. As another example, the processing device 140 may predict a breaking point of the breath-hold status based on the parameter value(s), and adjust the treatment and/or the scan based on the breaking point of the breath-hold status.

In some embodiments, the processing device 140 may be local to or remote from the medical system 100. For example, the processing device 140 may access information and/or data from the medical device 110, the storage device 150, and/or the terminal(s) 130 via the network 120. As another example, the processing device 140 may be directly connected to the medical device 110, the terminal(s) 130, and/or the storage device 150 to access information and/or data. In some embodiments, the processing device 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 140 may be implemented by a computing device 200 having one or more components as described in connection with FIG. 2.

In some embodiments, the processing device 140 may include one or more processors (e.g., single-core processor(s) or multi-core processor(s)). Merely by way of example, the processing device 140 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The storage device 150 may store data, instructions, and/or any other information. In some embodiments, the storage device 150 may store data obtained from the processing device 140, the terminal(s) 130, and/or the medical device 110. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components of the medical system 100 (e.g., the processing device 140, the terminal(s) 130). One or more components of the medical system 100 may access the data or instructions stored in the storage device 150 via the network 120. In some embodiments, the storage device 150 may be part of the processing device 140.

It should be noted that the above description of the medical system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the medical system 100 may include one or more additional components. Additionally or alternatively, one or more components of the medical system 100 described above may be omitted. As another example, two or more components of the medical system 100 may be integrated into a single component. In some embodiments, the processing device 140 (or a portion thereof) may be integrated into a monitoring device for monitoring a breath-hold status of the subject.

FIG. 2 is a schematic diagram illustrating exemplary hardware and/or software components of a computing device 200 according to some embodiments of the present disclosure. The computing device 200 may be used to implement any component of the medical system 100 as described herein. For example, the processing device 140, the terminal 130, and/or a monitoring device may be implemented on the computing device 200, respectively, via its hardware, software program, firmware, or a combination thereof. Although only one such computing device is shown, for convenience, the computer functions relating to the medical system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image data obtained from the medical device 110, the terminal(s) 130, the storage device 150, and/or any other component of the medical system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the medical device 110, the terminal(s) 130, the storage device 150, and/or any other component of the medical system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure. For example, the storage 220 may store a program for the processing device 140 to execute to generate a motion prediction model.

The I/O 230 may input and/or output signals, data, information, etc. In some embodiments, the I/O 230 may enable a user interaction with the processing device 140. In some embodiments, the I/O 230 may include an input device and an output device. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to another component (e.g., the processing device 140) via, for example, a bus, for further processing. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The communication port 240 may be connected to a network (e.g., the network 120) to facilitate data communications. The communication port 240 may establish connections between the processing device 140 and the medical device 110, the terminal(s) 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
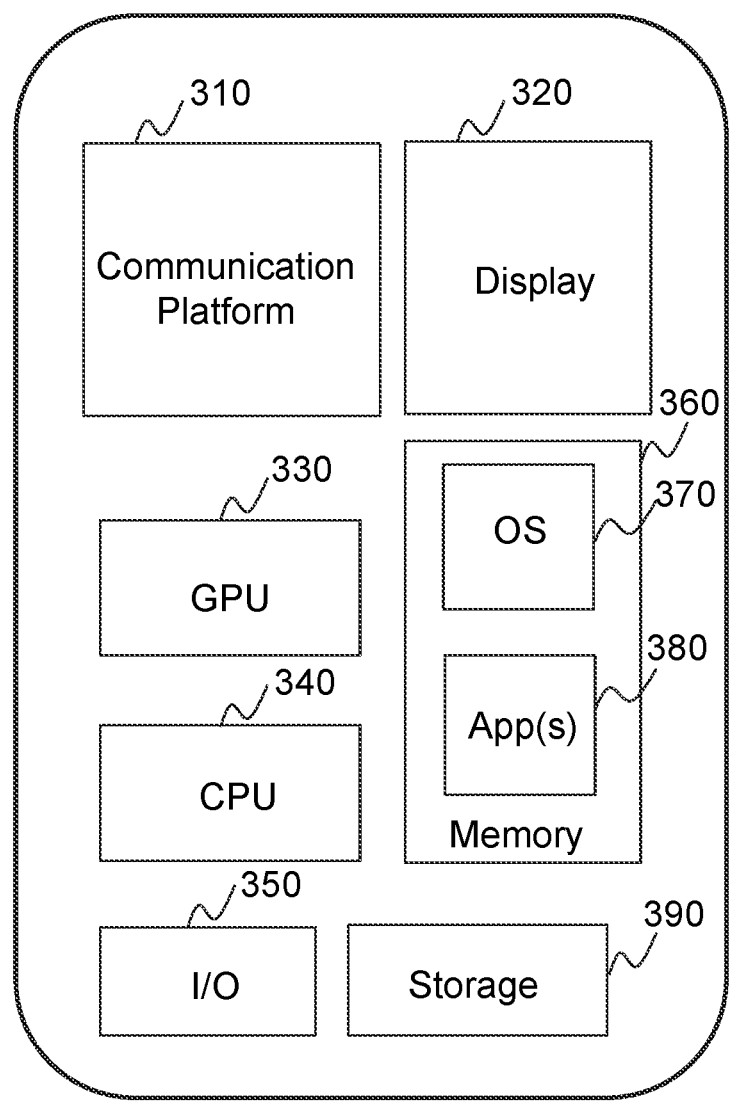
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, one or more components (e.g., a terminal 130 and/or the processing device 140) of the medical system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to the medical system 100. User interactions with the information stream may be achieved via the I/O 350 and provided to the processing device 140 and/or other components of the medical system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
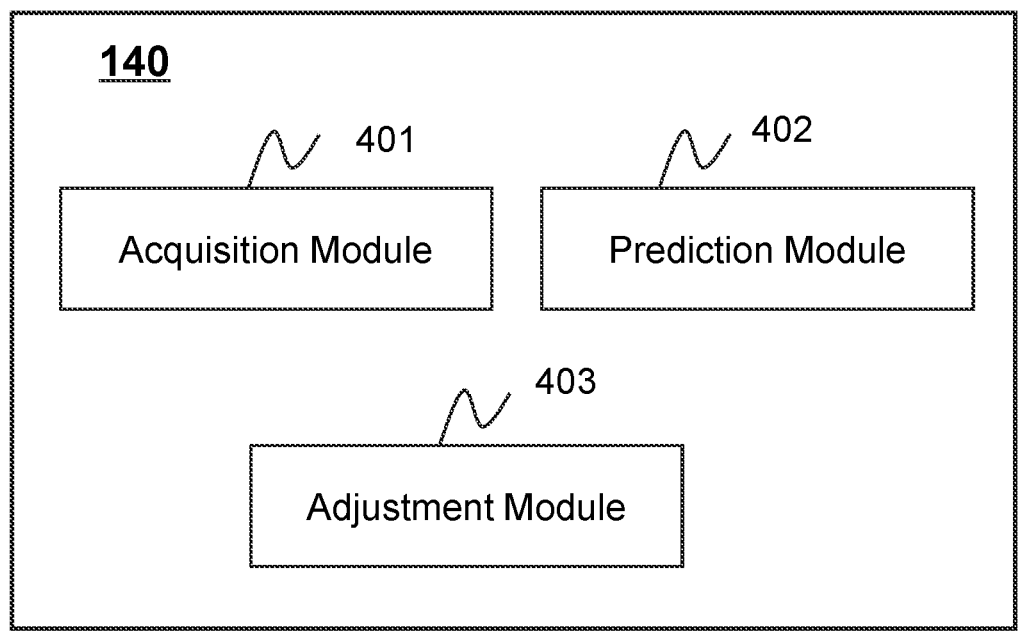
FIG. 4 is a block diagram illustrating an exemplary processing device according to some embodiments of the present disclosure.

FIG. 4 is a schematic diagram illustrating an exemplary processing device 140 according to some embodiments of the present disclosure. In some embodiments, the processing device 140 may cause a medical device (e.g., the medical device 110) to perform a treatment or a scan on a patient who remains in a breath-hold status. The processing device 140 may include an acquisition module 401, a prediction module 402, and an adjustment module 403.

The acquisition module 401 may be configured to acquire one or more parameter values relating to one or more status parameters that reflect a breath-hold status of the patient, wherein the parameter value(s) may be acquired using a monitoring device. The status parameter(s) may include any parameters that may reflect the breath-hold status of the patient, e.g., a motion of a leading region, a motion of an ROI associated with a respiration motion, a lung volume. More descriptions regarding the acquisition of the one or more parameter values relating to one or more status parameters may be found elsewhere in the present disclosure. See, e.g., 501 in FIG. 5 and relevant descriptions thereof.

The prediction module 402 may be configured to predict a breaking point of the breath-hold status based on the one or more parameter values. A breaking point of the breath-hold status refers to a predicted time point at which the patient may cease the breath-hold status and, e.g., take a breath or cough. For example, the prediction module 402 may determine whether a status parameter has a specific tendency based on one or more parameter values of the status parameter, and further determine the breaking point based on the determination result of whether the status parameter has a specific tendency. As another example, the processing device 140 may further determine the breaking point based on a determination result of whether a parameter value of a status parameter at the certain time point is within the range or greater than (or less than) the threshold value. More descriptions regarding the prediction of the breaking point may be found elsewhere in the present disclosure. See, e.g., 502 in FIG. 5 and relevant descriptions thereof.

The adjustment module 403 may be configured to adjust the treatment or the scan based on the breaking point of the breath-hold status. In some embodiments, the adjustment module 403 may determine an interruption time point to interrupt or pause the treatment or the scan based on the breaking point. An interruption time point refers to a time point when the treatment or the scan is suitable to be interrupted or paused. More descriptions regarding the adjustment of the treatment or the scan may be found elsewhere in the present disclosure. See, e.g., 503 in FIG. 5 and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140 may include one or more additional modules, and/or one or more modules described above may be omitted. Additionally or alternatively, two or more modules may be integrated into a single module and/or a module may be divided into two or more units. However, those variations and modifications also fall within the scope of the present disclosure.

FIG. 5 is a flowchart illustrating an exemplary process for monitoring a breath-hold status of a patient according to some embodiments of the present disclosure. In some embodiments, process 500 may be executed by the medical system 100. For example, the process 500 may be implemented as a set of instructions (e.g., an application) stored in a storage device (e.g., the storage device 150, the storage 220, and/or the storage 390). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 500.

In some embodiments, the processing device 140 may cause a medical device (e.g., the medical device 110) to perform a treatment or a scan on a patient who remains in a breath-hold status. As aforementioned, the patient may unexpectedly interrupt the breath-hold status. In addition, different patients may have different breath-hold capabilities. Thus, in order to improve the imaging or treatment precision, the processing device 140 may execute the process 500 to monitor the breath-hold status of the patient during the treatment or the scan of the patient.

In 501, the processing device 140 (e.g., the acquisition module 401) may acquire one or more parameter values relating to one or more status parameters that reflect the breath-hold status of the patient, wherein the parameter value(s) may be acquired using a monitoring device.

The status parameter(s) may include any parameters that may reflect the breath-hold status of the patient, such as a motion of a leading region (e.g., a point on the chest of the patient), a motion of an ROI associated with a respiration motion (e.g., the diaphragm, an intercostal muscle, an abdominal muscle, or the glottis of the patient), a lung volume, a distance between the body surface and a reference object (e.g., a distance measurement device), an intrathoracic pressure (i.e., a pressure within the pleural cavity), an afferent activity in one or more nerves associated with the respiration motion, a blood gas level, a hypercapnia level, a heart rate, a blood pressure, or the like, or any combination thereof, of the patient.

In some embodiments, the status parameter(s) may be determined according to a defaulting setting of the medical system 100. Additionally or alternatively, the status parameter(s) may be determined by a user (e.g., a doctor) manually. For different patients, a same set of status parameters or different sets of status parameters may be used.

In some embodiments, the status parameter(s) of the patient may be determined by the processing device 140 (or another computing device) by data analyzing. Merely by way of example, the processing device 140 may obtain experimental data relating to one or more test breath-holds of the patient. Before the scan or the treatment starts, the patient may be asked to perform one or more test breath-holds to obtain the experimental data. For example, each test breath-hold may last for a certain period and the patient may be asked to take a breath or allowed to cough after the test breath-hold. As another example, the patient may be asked to hold his/her breath and take a breath when he/she wants to breathe.

The processing device 140 may determine the one or more status parameters based on the experimental data. For example, the experimental data may include values of a plurality of candidate status parameters reflecting the status of the patient during the test breath-holds. The processing device 140 may select, among the plurality of candidate status parameters, one or more candidate status parameters that may best predict a breaking point at which the patient may cease the breath-hold status. The selected candidate status parameter(s) may be designated as the status parameter of the patient. For example, for each of the candidate status parameters, the processing device 140 may determine a variation of the candidate status parameter when the patient ceases a test breath-hold (e.g., when the patient changes from a breath-hold status to a breathing status or a cough status). A candidate status parameter that has an obvious variation (e.g., a variation greater than a threshold value) may be designated as one of the status parameter(s).

In some embodiments, the processing device 140 may determine one or more leading regions based on the experimental data, and determine the status parameter(s) based on at least partially on the leading region(s). For example, at least one of the status parameter(s) may be associated with the motion of the leading region(s). As used herein, a leading region refers to a region (e.g., a body surface region), the motion of which may lead or indicate a coming cessation of the breath-hold status. More descriptions regarding a leading region may be found elsewhere in the present disclosure. See, e.g., FIG. 6 and relevant descriptions thereof. By selecting the status parameter(s) and/or the leading region(s) of the patient according to the test breath-holds, the physiological characteristic of the patient may be taken into consideration in the prediction of the breaking point, which may improve the accuracy of the monitoring of the breath-hold status of the patient.

A parameter value relating to a status parameter may include a value, a variation value, a variation rate, a deviation value of the value of the status parameter from a reference value of the status parameter, or the like, or any combination thereof, of the status parameter. Taking the intrathoracic pressure of the patient as an example, a parameter value relating to the intrathoracic pressure may include a value of the intrathoracic pressure at each of one or more certain time points, a variation value and/or a variation rate of the intrathoracic pressure during a period, or the like, or any combination thereof.

In some embodiments, a parameter value of a status parameter may be measured by the monitoring device, and the processing device 140 may obtain the parameter value from the monitoring device. For example, the value of the intrathoracic pressure of the patient may be measured by a pressure measurement device of the monitoring device. In some embodiments, the monitoring device may include one or more components configured to obtain information relating to a status parameter. The processing device 140 may obtain the information relating to the status parameter from the monitoring device, and determine a parameter value of the status parameter by processing the information relating to the status parameter. For example, a heart rate measurement device of the monitoring device may be used to measure the heart rate of the patient during a period. The processing device 140 may obtain the measured heart rate from the monitoring device, and determine a variation (or change) of the heart rate during the period based thereon. As another example, the monitoring device may be used to measure a first parameter value relating to a first status parameter, wherein the first status parameter may have a certain correlation with a second status parameter. The processing device 140 may obtain the first parameter value from the monitoring device, and determine a second parameter value of the second status parameter based on the first parameter value and the certain correlation. Merely by way of example, a distance measurement device may be used to measure a distance between the body surface and the distance measurement device. The processing device 140 may obtain the measured distance from the monitoring device, and estimate a value of the lung volume of the patient based on the measured distance and the correlation between the lung volume and the distance.

In some embodiments, the monitoring device may be configured to monitor the patient continuously or intermittently (e.g., periodically) during the treatment or scan. In some embodiments, after the monitoring device acquires a monitoring result (e.g., a parameter value of a status parameter, information relating to a status parameter), the monitoring device may transmit the monitoring result to the processing device 140 for further analysis. In some embodiments, the acquisition of the monitoring result by the monitoring device, the transmission of the monitoring result from the monitoring device to the processing device 140, and the analysis of the monitoring result may be performed substantially in real-time so that the parameter value(s) of the status parameter(s) may provide information indicating a substantially real-time status of the patient.

In 502, the processing device 140A (e.g., the prediction module 402) may predict a breaking point of the breath-hold status based on the one or more parameter values.

A breaking point of the breath-hold status refers to a predicted time point at which the patient may cease the breath-hold status and, e.g., take a breath or cough. For example, the processing device 140 may determine whether a status parameter has a specific tendency based on one or more parameter values of the status parameter. The processing device 140 may further determine the breaking point based on the determination result of whether the status parameter has a specific tendency. Merely by way of example, the parameter value(s) of the status parameter(s) may provide information indicating a substantially real-time status of the patient as aforementioned. An increasing tendency or a decreasing tendency of a specific status parameter may be regarded as a predictor or evidence of the breaking point. If the specific status parameter has an increasing tendency or a decreasing tendency, the processing device 140 may determine the current time point or a time point after a certain period (e.g., 0.5 seconds, 1 second, 2 seconds, or the like) as the breaking point. Exemplary predictors or evidences of the breaking point may include an increase in a partial pressure of $CO_2$ ($paCO_2$) in the bloodstream and/or within the lung volume, a decrease in the partial pressure of $O_2$ ($paO_2$) in the bloodstream and/or within the lung volume, an appearance of an afferent nervous feedback from the diaphragm (likely via the vagus nerve from proprioceptors and chemoreceptors in the diaphragm), a decreased lung volume as $O_2$ is removed from lung contents while $CO_2$ cannot fully return to the lung volume due to a high alveolar $CO_2$ concentrations, or the like, or any combination thereof. As another example, the processing device 140 may determine a predicted period in which the patient can still hold his/her breath according to the parameter value(s) of a status parameter, and estimate the breaking point based on the present time point and the predicted period.

As still another example, the processing device 140 may determine whether a parameter value of a status parameter at a certain time point is within a value range or greater than (or less than) a threshold value. The processing device 140 may further determine the breaking point based on the determination result of whether the parameter value of the status parameter at the certain time point is within the range or greater than (or less than) the threshold value. Merely by way of example, if the value of the lung volume at a certain time point is lower than a threshold volume, the processing device 140 may determine the certain time point or a time point after the certain time point as the breaking point. As yet another example, the processing device 140 may determine the breaking point based on the value of the lung volume according to a correlation between the lung volume and an estimated breath-hold duration. In some embodiments, the value range or threshold value with respect to a status parameter may be determined based on the experimental data as described in connection with operation 502 so that the physiological characteristic of the patient may be considered in the patient monitoring.

In some embodiments, the processing device 140 may predict the breaking point based on two or more status parameters. For example, for each status parameter, the processing device 140 may determine a candidate breaking point based on its corresponding status parameter(s). The processing device 140 may further determine the breaking point based on a combination of the candidate breaking points of the two or more status parameters. Merely by way of example, each status parameter may have a weight indicating its importance, and the processing device 140 may determine breaking point based on the candidate breaking point and the weight of each status parameter. As another example, the processing device 140 may designate an earliest candidate breaking point among the candidate breaking points as the breaking point. As yet another example, the processing device 140 may determine the breaking point based on the parameter values of the status parameters by applying a breaking point prediction model (e.g., a trained machine learning model for predicting a breaking point). By predicting the breaking point based on two or more status parameters, the predicted breaking point may be more accurate, and/or the scan or the treatment may be performed with a higher precision. More descriptions regarding the prediction of the breaking point may be found elsewhere in the present disclosure. See, e.g., FIG. 6 and relevant descriptions thereof.

In 503, the processing device 140 (e.g., the adjustment module 403) may adjust the treatment or the scan based on the breaking point of the breath-hold status.

In some embodiments, the processing device 140 may determine an interruption time point to interrupt or pause the treatment or the scan based on the breaking point. An interruption time point refers to a time point when the treatment or the scan is suitable to be interrupted or paused. For example, the interruption time point may be a time point within a time window (e.g., 1 second, 2 seconds, 3 seconds, or the like) after the breaking point. As another example, the interruption time point may be the breaking point itself. The processing device 140 may cause the medical device to pause the treatment or the scan at the interruption time point. For example, the processing device 140 may direct the medical device to pause the radiation delivery toward the patient at the interruption time point.

In some embodiments, the processing device 140 may predict a starting time point to resume the treatment or the scan, and cause the medical device to resume the treatment or the scan at the starting time point. For example, the patient may be allowed to breathe for a certain time period after the interruption time point, and asked to hold his/her breath again after the certain time period. The starting time point may be a time point when or after the patient holds his/her breath again.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may be accomplished with one or more additional operations not described and/or without one or more of the operations discussed above. For example, the process 500 may include an additional operation to transmit the breaking point or the interrupting time point to a terminal device (e.g., a terminal device 130 of a doctor) for display.

FIG. 6 illustrates a table 600 of exemplary status parameters of a patient and exemplary components of a monitoring device according to some embodiments of the present disclosure.

As described in connection with FIG. 5, during a scan or treatment of a patient holding a breath-hold status, one or more parameter values of one or more status parameters of the patient may be acquired using the monitoring device. The parameter value(s) may be used to monitor the breath-hold status of the patient, for example, predict a breaking point of the breath-hold status, in order to eliminate or reduce the effect of an unexpected interruption of the breath-hold status. As shown in FIG. 6, various status parameters corresponding to different organs or tissues of the patient may be monitored during the treatment or the scan. For each status parameter, the monitoring device may include one or more components that are capable of measuring the status parameter or collecting information associated with the status parameter.

It should be noted that the table 600 is provided for illustration purposes, and not intended to be limiting. In some embodiments, the status parameters used to monitor the breath-hold status may be not limited to those listed in the table 600. Additionally, the monitoring device may include one or more other components for measuring each of the status parameters. Additionally or alternatively, one or more of the status parameters and/or one or more components of the monitoring device listed in table 600 may be omitted.

As shown in FIG. 6, the status parameters may include or relate to a motion of an ROI of the patient that is associated with a respiration motion of the patient, such as an organ or a tissue that may move before or when a patient has a respiration motion. Exemplary ROIs associated with the respiration motion may include a diaphragm, an intercostal muscle, an abdominal muscle, the glottis, or the like, or any combination thereof, of the patient. Merely by way of example, normally, a breath-hold status of the patient may go through a first period in which a respiratory muscle activity is controlled by a voluntary inhibition, and a second period in which the patient has an involuntary respiratory activity. An involuntary respiration refers to any form of respiratory control that is not under direct and/or conscious control of the patient. The occurrence of an involuntary respiratory activity (or the second period) may be detected by detecting a motion of one or more certain organs of the patient. For example, a diaphragm muscle activity may begin to increase toward the end of the first period; therefore, an increasing motion of a diaphragm muscle may indicate that the second period may begin. As another example, the involuntary respiratory activity (or referred to as a central respiratory rhythm) may be detected by detecting a 'tracheal tugging'" against a closed glottis. The "tracheal tugging" refers to a downward pull of the trachea and larynx of the patient. As yet another example, a detection of a varying cardiac motion (e.g., indicated by a variation in the heart rate) may indicate the resumption of a central respiratory rhythm (i.e., that is not under conscious control of the patient, and so could not, for example, be indicated by a patient [for example, by means of a push button] so that the procedure may be paused before respiratory status changes).

In some embodiments, the monitoring device may include an imaging device and/or an EMG electrode configured to monitor the motion of the ROI. The imaging device may be configured to capture a plurality of images of the ROI at a plurality of time points. The monitoring device or the processing device 140 may determine parameter value(s) indicating the motion of the ROI based on the images captured by the imaging device. For example, the processing device 140 may determine the position of the ROI in each of the images so as to track the motion of the ROI over the plurality of time series. Exemplary imaging devices may include an electrical impedance tomography (EIT) electrode, an ultrasonic transducer, a cine x-ray system (producing a time series of x-ray frames), an MRI device, a PET device, a SPECT device, an implanted fiducial system (e.g., a radio frequency beacon system such as a Calypso system), an ultrasound imaging system, or the like, or a combination thereof. The EMG electrode may be configured to measure an EMG of the ROI.

In some embodiments, the processing device 140 may predict the breaking point of the breath-hold status of the patient based on the parameter value(s) relating to the motion of an ROI of the patient. Merely by way of example, the processing device 140 may determine whether the ROI has a rhythmic motion or a gross motion based on the parameter value(s) relating to the motion of the ROI. An ROI having a rhythmic motion may move at or substantially at a certain pace and/or amplitude. An ROI having a sudden motion may suddenly change from a stationary state (or substantially stationary state) to a motion state. The processing device 140 may further predict the breaking point based on a determination result as to whether the ROI has a rhythmic motion or a gross motion. Normally, a rhythmic motion or an increased rhythmic motion (usually at an expected respiration rate of the patient) of the ROI (e.g., a diaphragm, an abdominal muscle, and/or an intercostal muscle) may be used as a factor to suggest an urgency to breathe is increasing. When the patient is about to cough, a sudden gross motion of the ROI may occur. Accordingly, a detection of a sudden gross motion of the ROI may be used as a signal to turn off the radiation beam as fast as possible because it indicates that the patient is about to cough. Accordingly, in some embodiments, if it is determined that the ROI has a rhythmic motion or a gross motion, the processing device 140 may determine the present time point or a time point immediately after the present time point as the breaking point of the breath-hold status.

For illustration purposes, the analysis of the motion of the diaphragm and/or the glottis of the patient during a medical procedure, e.g., a treatment or a scan, is described hereinafter as an example. In some embodiments, the processing device 140 may determine whether the diaphragm or the glottis of the patient has a rhythmic motion or a gross motion based on an imaging device as the monitoring device. For example, one or more EIT electrodes may be configured upon a first belt, which may be placed on the patient (e.g., the chest) to capture a plurality of first images of the diaphragm during the medical procedure. As another example, one or more ultrasonic transducers may be configured upon a second belt, for example, using a flexible capacitive micromachined ultrasonic transducer (CMUT) array. The second belt may be placed on the patient (e.g., a zone of apposition of the patient) to capture a plurality of second images of the diaphragm during the treatment or the scan. The zone of apposition of the patient refers to a vertical area of the diaphragm that begins at its insertion point on the inside of the lower ribs and extends to the top of the diaphragm.

As still another example, a cine x-ray system may be used to capture a plurality of third images of the diagram by scanning the diaphragm from one or more views. The monitoring device or the processing device 140 may track the position of the diaphragm in the images captured by the imaging device (e.g., the first mages, the second images, and/or the third images). The processing device 140 may further determine whether the diagram has a rhythmic motion or a gross motion according to the position of the diagram. As yet another example, a rhythmic motion of the glottis (e.g., a rhythmic tracheal tugging against a closed glottis) of the patient may be detected using an ultrasound imaging system configured to image the body surface of the patient. The processing device 140 may detect any surface of the patient that is subject to a negative pressure wave due to a central respiratory rhythm based on image data collected by the ultrasound imaging system. Normally, the pressure within the pleural cavity (i.e., the intrathoracic pressure) of human may be less than the atmospheric pressure, and the pressure within the pleural cavity may be referred to as a negative pressure. The negative pressure wave may be caused by a fluctuation of the negative pressure within the pleural cavity. The negative pressure wave may indicate an occurrence of a central respiratory rhythm (i.e., a respiratory motion of the patient).

Additionally or alternatively, the processing device 140 may determine whether the diaphragm of the patient has a rhythmic motion or a gross motion based on an EMG electrode of the monitoring device. The EMG electrode may be configured to measure the EMG of the diaphragm at or within the surface of the patient. The EMG electrode may include a surface EMG electrode, a needle EMG electrode inserted into the body (e.g., the diaphragm muscle) of the patient, or the like, or a combination thereof. For example, a bipolar esophageal lead may be used to record an EMG of the diaphragm muscle. As another example, an external electrode may be used to record an EMG of an external oblique abdominal muscle. As yet another example, an intra-esophageal EMG electrode may be used to measure an EMG of the diaphragm. The processing device 140 may determine whether the diaphragm has a rhythmic motion or a gross motion based on the EMG of the diaphragm.

Additionally or alternatively, the processing device 140 may determine whether one or more accessory breathing muscles of the patient has a rhythmic motion or a gross motion based on an EMG electrode of the monitoring device. The accessory breathing muscle(s) used in respiration may include the sternocleidomastoid muscles and/or the scalene muscles of the patient. Normally, these accessory breathing muscles are not used in normal respiration at rest (eupnea) but are activated during coughs and sneezes. The EMG electrode may be configured to measure the EMG of the accessory breathing muscles at or within the surface of the patient.

Additionally or alternatively, the processing device 140 may determine whether one or more expiration muscles of the patient have a rhythmic motion or a gross motion based on an EMG electrode of the monitoring device. The expiration muscle(s) may include the internal intercostal muscles and/or the muscles of the abdominal wall of the patient. The EMG electrode may be configured to measure the EMG of the expiration breathing muscles at or within the surface of the patient.

As shown in FIG. 6, the status parameters may include or relate to a motion of a leading region associated with the breaking point (or a cessation of the breath-hold status). A leading region refers to a region (e.g., a body surface region), the motion of which may lead or indicate a coming cessation of the breath-hold status. The motion of the leading region may be regarded as the first sign that indicates that the patient will exhale and the breath-hold status may be ceased. For example, before the cessation of the patient's breath-hold status, a specific point on the abdomen (e.g., a right abdominal muscle) of the patient may move earlier than a point on the chest of the patient. The specific point on the abdomen of the patient may be regarded as a leading region associated with the breaking point. In some embodiments, the leading region may include a body surface region corresponding to an internal ROI associated with the respiration motion of the patient.

In some embodiments, the leading region(s) of the patient may be determined by a user (e.g., a doctor) manually, for example, according to experience. Additionally or alternatively, the leading region(s) may be determined according to a default setting of the medical system 100. In some embodiments, the processing device 140 may determine the leading region(s) based on the experimental data relating to one or more test breath-holds of the patient as described in connection with operation 501. For example, the experimental data may include motion data of the body surface of the patient during the test breath-holds. The motion data of the body surface of the patient may be obtained by, for example, an optical system during the one or more test breath-holds. The processing device 140 may determine one or more leading regions associated with the breaking point based on the motion data of the body surface of the patient. Merely by way of example, based on the motion data of the body surface of the patient, the processing device 140 may determine time points at which different body surface regions of the patient start moving during the test breath-holds. The processing device 140 may further identify one or more body surface regions that move earlier than a time point when the patient stops each test breath-hold, and designate the identified body surface region(s) as the leading region(s). For example, if a point on the abdomen of the patient moves before each time the patient stops a test breath-hold, the point on the abdomen may be identified as a leading region.

In some embodiments, the processing device 140 may determine the leading region(s) based on historical motion data of the same patient or one or more other patients (each referred to as a sample patient) from one or more prior medical procedures of a same or different type (e.g., same or different types of imaging procedures, same or different types of treatment procedures, a measurement of the leading region(s) in a monitoring period or procedure, etc.). Merely by way of example, based on the motion data of the body surface of one or more sample patients, the processing device 140 may determine time points at which different body surface regions of the sample patient(s) start moving during the breath-holds in one or more of the prior medical procedure(s). The processing device 140 may further identify one or more body surface regions that move earlier than a time point when the sample patient(s) stop(s) a breath-hold in one or more of the prior medical procedure(s), and designate the identified body surface region(s) as the leading region(s). For example, if a point on the abdomen of the sample patient(s) moves before each time the sample patient (s) stop(s) a breath-hold in one or more of the prior medical procedure(s), the point on the abdomen may be identified as a leading region.

In some embodiments, the monitoring device may include one or more of a respiratory sensor, an optical device, a radar device, an electromyography (EMG) electrode, or the like, configured to monitor the motion of a leading region. For example, the respiration sensor (e.g., an abdominal respiratory belt) may be placed at the leading region, so as to record the motion in the leading region. As another example, the optical device may be used to perform a non-contact monitor of the motion of the leading region. As yet another example, an EMG electrode may be used to measure an EMG of the leading region (e.g., a right abdominal muscle), which may be used to detect the motion of the leading region.

In some conditions, if the monitoring device detects the motion of the leading region(s), it may be predicted that the patient is about to interrupt the breath-hold status for a breath. That is, the one or more status parameters relating to the motion of the leading region(s) may be used to predict a breaking point of the breath-hold status of the patient. In such cases, the processing device 140 may adjust the treatment or the scan based on the predicted breaking point in a manner as described elsewhere in the present disclosure. See, e.g., 503 and relevant descriptions thereof.

As shown in FIG. 6, the status parameters may include or relate to a lung volume of the patient. When the patient remains in the breath-hold status, the lung volume of the patient may decrease, since $O_2$ is removed from the lungs of the patient, while $CO_2$ cannot fully return to the lung volume due to a high alveolar $CO_2$ concentration. The lung volume may decrease as the breath-hold status maintains during a breath-hold duration (i.e., the duration of the breath-hold status) increases, for example, at a rate of between 200 and 500 ml/min. The rate of lung volume decrease during breath-hold may be related to the rate at which the patient consumes oxygen present in the lung volume and may indicate the amount of depletion of oxygen and consequently the level of urgency to resume respiration. In some embodiments, a measurement device such as a respiratory impedance plethysmograph and/or an optical system (e.g., a time-of-flight sensor) may be used to determine an extent to which the lung contents have been absorbed into the bloodstream. In some embodiments, a rate of a decrease of the lung volume vs the breath-hold duration (being related to slope of the lung volume vs time curve during breath-hold) of the patient may be determined. The lung volume (or the decrease of the lung volume) and/or the rate of the decrease of the lung volume before an interruption of the breath-hold status may be used as factor(s) to predict the patient's urgency to breathe (i.e., the breaking point).

In some embodiments, one or more parameter values relating to the lung volume may be determined based on a distance measurement device of the monitoring device. The distance measurement device may be configured to measure a distance between the distance measurement device and the body surface of the patient. Exemplary distance measurement devices may include an optical sensor, an ultrasound sensor, a radar sensor (including millimeter wave scanners), a time-of-flight sensor, a structured light-based sensor, or a marker-based sensor, or the like, or any combination thereof. In some embodiments, the radar device may be able to monitor the motion of internal structure(s) of the patient, such as the diaphragm. For example, the radar sensor may be configured to emit waves that can penetrate the body surface of the patient and measure a distance between the radar sensor and an internal structure of the patient. The variation of the distance between the radar sensor and the internal structure of the patient over a time period may be used to detect the motion of the internal structure of the patient.

Merely by way of example, the processing device 140 may acquire the distance between the distance measurement device and a body surface of the patient (e.g., the chest of the patient) from the distance measurement device, on the basis of which the processing device 140 may estimate one or more parameter values relating to the lung volume of the patient. For example, the one or more parameter values relating to the lung volume may include a value of the lung volume, a variation or deviation value of the lung volume from a reference lung value (e.g., the lung volume at the end of inspiration, the lung volume at the end of expiration, an average lung volume, etc.), a rate of a decrease of the lung volume vs a breath-hold duration, or the like. The processing device 140 may further predict the breaking point of the breath-hold status based on the parameter value(s) relating to the lung volume. Merely by way of example, if the rate of the decrease of the lung volume to the breath-hold duration exceeds a threshold at a certain time point, the processing device 140 may determine the certain time point or a time point immediately after the certain time point as the breaking point. As used herein, "immediately after" a time point may include no more than 5 seconds, or 3 seconds, or 2 seconds, or 1 second, etc., after the time point.

As shown in FIG. 6, the status parameter may include or relate to a respiration motion of the patient. The monitoring device may include a respiration detection device configured to monitor the respiration motion of the patient. For example, the respiration detection device may include a closed tube equipped with a pressure sensor. The closed tube may be operably coupled to at least one of the mouth or the nose of the patient. The pressure sensor may detect the respiration motion of the patient by determining whether the patient begins to suck or blow into the closed tube. If the pressure sensor detects that the patient begins to suck or blow into the closed tube, the respiration detection device may determine that a respiration motion of the patient is detected.

In some embodiments, the processing device 140 may predict the breaking point of the breath-hold status based on the detection result of the respiration detection device. For example, a time point when the respiration detection device detects a respiration motion of the patient or another time point immediately after the time point may be determined as the breaking point.

As shown in FIG. 6, the status parameter may include or relate to an intrathoracic pressure of the patient. At least one of the one or more parameter values acquired in operation 501 may relate to the intrathoracic pressure of the patient. For example, the one or more parameter values may include a value of the intrathoracic pressure, a variation or deviation value of the intrathoracic pressure from a reference intrathoracic pressure, or the like. In some embodiments, a detection of a negative pressure wave in the respiratory system of the patient may indicate that the breath-hold status progresses toward the breaking point. The negative pressure wave may be detected by measuring the intrathoracic pressure of the patient. Alternatively, or in addition, the intrathoracic pressure may be compared to the ambient atmospheric pressure (as an exemplary reference intrathoracic pressure). For example, if the difference between intrathoracic pressure and atmospheric pressure is negative, this may be regarded as an indication that the patient thorax is tending to or preparing to expand (inhale). Also for example, if the difference between intrathoracic pressure and atmospheric pressure is positive and stable, this may be regarded as an indication of maintained breath-hold status of the patient. If this positive value varies beyond a threshold from a constant value, this may indicate/predict a cessation of the breath-hold status of the patient.

In some embodiments, the monitoring device may include a pressure measurement device configured to measure the intrathoracic pressure of the patient. Merely by way of example, the pressure measurement device may include a pressure sensor mounted on an esophageal balloon. The esophageal balloon may be placed in the esophagus of the patient. For example, the esophageal balloon may be inserted via the nasal passage of the patient and placed in the esophagus. The esophageal balloon may be attached to the pressure sensor that is used to record the intrathoracic pressure during the treatment or the scan.

In some embodiments, the processing device 140 may acquire parameter value(s) (e.g., a value or a variation value) relating to the intrathoracic pressure from the pressure measurement device. The processing device 140 may further predict the breaking point based on the parameter value(s) relating to the intrathoracic pressure. For example, the processing device 140 may determine whether the diaphragm has a rhythmic motion or a gross motion based on the parameter value(s) relating to the intrathoracic pressure. Merely by way of example, the processing device 140 may determine that the diaphragm has a gross motion if the value of the intrathoracic pressure suddenly changes at a certain time point. The processing device 140 may further determine the certain time point or a time point immediately after the certain time point as the breaking point of the breath-hold status.

As shown in FIG. 6, the status parameter may relate to an afferent activity in one or more nerves associated with the respiration motion of the patient. At least one of the one or more parameter values acquired in operation 501 may relate to the afferent activity. For example, the one or more parameter values may include a parameter value indicating whether an afferent nervous feedback is received from, for example, the diaphragm of the patient. The one or more nerves associated with the respiration motion may include, for example, a vagus nerve and/or a phrenic nerve. Normally, if the patient is about to breathe, an afferent nervous feedback may be received from the diaphragm (e.g., a proprioceptor and/or a chemoreceptor in the diaphragm) via, for example, the vagus nerve. Accordingly, a detection of an afferent nervous feedback from the diaphragm may reflect a chemoreceptor afferent activity and/or a proprioceptor afferent activity outputted from the diaphragm, which indicates that the patient is about to breathe.

In some embodiments, the monitoring device may include a nerve monitoring device configured to monitor the afferent activity (e.g., an afferent nervous feedback from the diaphragm) in the nerve(s). For example, the nerve monitoring device may include an electrode, an electrode array (e.g., a microfabricated silicon carbide array), or the like, or a combination thereof. Merely by way of example, an electrode may be inserted into the vagal nerve or the phrenic nerve of the patient to monitor the afferent activity in these nerves, so as to detect the corresponding afferent nervous feedback.

In some embodiments, the processing device 140 may acquire a parameter value indicating whether an afferent nervous feedback is received from the nerve monitoring device, and determine the breaking point based thereon. For example, a time point when the nerve monitoring device detects an afferent nervous feedback from the diaphragm or a time point immediately after the time point may be determined as the breaking point.

As shown in FIG. 6, the status parameters may include or relate to a blood gas level of the patient. At least one of the one or more parameter values acquired in operation 501 may relate to the blood gas level of the patient. For example, the one or more parameter values may include the $O_2$ level in the blood, the variation of the 02 level in the blood, the $CO_2$ level in the blood, the variation of the $CO_2$ level in the blood, or the like, or a combination thereof. When the patient remains in the breath-hold status, the $O_2$ may be removed from the lungs, and the $CO_2$ may not be fully returned to the lungs. As the breath-hold duration increases, the $O_2$ level in the blood of the patient may decrease and the $CO_2$ level in the blood of the patient may increase.

In some embodiments, the monitoring device may include an arterial blood sampling device configured to sample blood from the patient so as to measure the blood gas level of the patient. For example, the arterial blood sampling device may include a radial artery cannulation used to sample the blood of the patient to determine the $O_2$ level and/or the $CO_2$ level in the blood. The processing device 140 may acquire the parameter value(s) (e.g., the $O_2$ level and/or the $CO_2$ level) relating to the blood gas level from the arterial blood sampling device. The processing device 140 may predict the breaking point based on the parameter value(s) relating to the blood gas level. For example, if the $O_2$ level is smaller than a first threshold and/or the $CO_2$ level is greater than a second threshold at a certain time point, the processing device 140 may determine the certain time point or a time point immediately after the time point as the breaking point. As another example, if the increase of $CO_2$ concentration in blood during a certain period is greater than a third threshold, the processing device 140 may determine a time point after a certain period as the breaking point.

As shown in FIG. 6, the status parameters may include or relate to a hypercapnia level of the patient. At least one of the one or more parameter values acquired in operation 501 may relate to the hypercapnia level of the patient. Hypercapnia refers to a condition of an abnormally elevated $CO_2$ levels in the blood of the patient, which may induce an interruption of the breath-hold status of the patient. For example, if the hypercapnia level of the patient reaches a certain level, the patient may need to take a breath.

In some embodiments, the hypercapnia level may increase with an increase of a brain blood volume of the patient. The hypercapnia level may be determined by measuring the brain blood volume of the patient. For example, the monitoring device may include a brain blood volume measurement device configured to measure the brain blood volume of the patient. The brain blood volume may be measured by measuring the diameter of a middle cerebral artery (MCA) (and/or another cerebral artery) and/or a flow velocity of the brain blood in the MCA (and/or another cerebral artery).

For example, the brain blood volume measurement device may be used to measure the diameter of the MCA. As another example, the brain blood volume measurement device may be used to measure the flow velocity of the brain blood in the MCA by using a transcranial Doppler ultrasound measurement technique, and estimate the brain blood volume based on the flow velocity. The brain blood volume measurement device or the processing device 140 may determine the brain blood volume based on the diameter of the MCA and/or the flow velocity of the brain blood in the MCA. The processing device 140 may further estimate the at least one parameter value relating to the hypercapnia level of the patient based on the brain blood volume of the patient, for example, according to a relationship between the hypercapnia level and the brain blood volume. The processing device 140 may then predict the breaking point based on the hypercapnia level. For example, the processing device 140 may determine a predicted period in which the patient can still hold his/her breath according to the hypercapnia level, and estimate the breaking point based on the present time point and the predicted period.

As shown in FIG. 6, the status parameters may include or relate to a heart rate of the patient. At least one of the one or more parameter values acquired in operation 501 may relate to the heart rate of the patient. For example, the one or more parameter values may include a heart rate, a variation (or change) of the heart rate, a heart rate variability (e.g., a heart rate variability in a frequency band corresponding to a typical respiration rate), or the like, or any combination thereof. The heart rate variability refers to a physiological phenomenon of variation in the time interval between consecutive heartbeats, which is measured by measuring the variation in the beat-to-beat interval. In some embodiments, the heart rate may increase with the breath-hold duration. An increase of the heart rate may indicate a re-expression of a central respiratory rhythm (i.e., a cessation of the breath-hold status). Additionally or alternatively, an increase of the heart rate variability may indicate an expression of a central respiratory impetus to end the breath-hold status and resume natural breathing.

In some embodiments, the monitoring device may include a heart rate measurement device, e.g., an electrocardiography (ECG), a photoplethysmograph, or the like, to measure the heart rate of the patient. The monitoring device or the processing device 140 may determine parameter value(s) relating to the heart rate based on the measurement result of the heart rate measurement device or a pulse meter. For example, the processing device 140 may determine the heart rate variability in the time domain based on the measurement result of the heart rate measurement device. The processing device 140 may further transform the heart rate variability from the time domain to a frequency domain, for example, by using a Fourier transform algorithm. Then, the processing device 140 may analyze the heart rate variability in the frequency domain corresponding to a typical respiration rate. For example, a central respiratory contribution to the heart rate variability may be determined. The processing device 140 may predict the breaking point based on the central respiratory contribution to the heart rate variability. For example, a higher central respiratory contribution to the heart rate variability may indicate a higher urgency to breathe.

As another example, a threshold-based analysis may be performed based on the parameter value(s) relating to the heart rate to determine the breaking point. For example, if the heart rate is greater than a threshold rate at a certain time point, the processing device 140 may determine the certain time point or a time point immediately after the time point as the breaking point. As another example, if a rate of change of the heart rate during a certain period is greater than a threshold rate, the processing device 140 may determine the current time point or a time point after the certain period as the breaking point.

As shown in FIG. 6, the status parameter may include or relate to a blood pressure of the patient. At least one of the one or more parameter values acquired in operation 501 may relate to the blood pressure of the patient. The monitoring device may include a blood pressure measurement device used to measure the blood pressure of the patient. The processing device 140 may obtain the blood pressure from the blood pressure measurement device, and predict the breaking point based on the blood pressure. In some embodiments, the blood pressure may be modulated by a change in the intrathoracic pressure of the patient. The blood pressure may be used to determine a presence and/or a strength/magnitude of a pressure wave due to a diaphragm activity. For example, the processing device 140 may determine whether a negative pressure wave exists based on a change in the blood pressure. If it is determined that a negative pressure wave occurs at a certain time point, the processing device 140 may determine the certain time point or a time point immediately after the time point as the breaking point. As another example, the blood pressure may increase as the breath-hold status maintains. In some embodiments, a negative pressure wave may be detected by measuring a change in the blood pressure of the patient and/or one or more correlates (or associated parameters) of the change in the blood pressure, such as a change of the arterial pulse with time. In some embodiments, the parameter value(s) relating to the blood pressure may be used in determining whether the diaphragm has a rhythmic motion or a gross motion.

In some embodiments, a threshold-based analysis may be performed based on the parameter value(s) relating to the blood pressure to determine the breaking point. For example, if the blood pressure is greater than a threshold value at a certain time point, the processing device 140 may determine the certain time point or a time point immediately after the time point as the breaking point. As another example, if a rate of change of the blood pressure during a certain period is greater than a threshold rate, the processing device 140 may determine the current time point or a time point after the certain period as the breaking point.

It should be noted that the table in FIG. 6 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for patient monitoring, comprising:
at least one storage device comprising a set of instructions; and
at least one processor configured to communicate with the at least one storage device, wherein when executing the set of instructions, the at least one processor is configured to direct the system to perform operations comprising:
obtaining experimental data relating to one or more test breath-holds of a patient, wherein the experimental data comprises motion data of a body surface of the patient;
determining, based on the experimental data, one or more status parameters that reflect a breath-hold status of the patient;
causing a medical device to perform a treatment or a scan on the patient who remains in the breath-hold status, wherein during the treatment or the scan of the patient, acquiring, using a monitoring device, one or more parameter values relating to the one or more status parameters that reflect the breath-hold status of the patient;
predicting, based on the one or more parameter values, a breaking point of the breath-hold status at which the patient ceases the breath-hold status; and
adjusting, based on the breaking point of the breath-hold status, the treatment or the scan, wherein the determining, based on the experimental data, one or more status parameters, comprises:
determining, based on the motion data of the body surface of the patient, one or more leading regions associated with the breaking point, wherein each leading region is a region, the motion of which leads or indicates a coming cessation of the breath-hold status; and
determining, based on the one or more leading regions, the one or more status parameters, at least one of the one or more status parameters relating to a motion of the one or more leading regions.

2. The system of claim 1, wherein the adjusting the treatment or the scan based on the breaking point of the breath-hold status comprises:
determining, based on the breaking point, an interruption time point to interrupt the treatment or the scan; and
causing the medical device to interrupt the treatment or the scan at the interruption time point.

3. The system of claim 1, wherein
at least one of the one or more parameter values relates to a motion of a region of interest (ROI) of the patient, the ROI being associated with a respiration motion of the patient, and
the predicting a breaking point of the breath-hold status based on the one or more parameter values comprises:
determining, based on the at least one parameter value relating to the motion of the ROI of the patient, whether the ROI has a rhythmic motion or a gross motion; and
predicting, based on a determination result as to whether the ROI has a rhythmic motion or a gross motion, the breaking point.

4. The system of claim 3, wherein the monitoring device comprises at least one of an imaging device configured to capture one or more images of the ROI or an electromyography electrode configured to measure an electromyography of the ROI.

5. The system of claim 1, wherein
the monitoring device comprises a distance measurement device configured to measure a distance between the distance measurement device and the body surface of the patient, and acquiring one or more parameter values relating to the one or more status parameters that reflect the breath-hold status of the patient comprises:
  acquiring, using the distance measurement device, the distance between the distance measurement device and the body surface of the patient; and
  estimating, based at least partially on the distance, the one or more parameter values, at least one of the one or more parameter values relating to a lung volume of the patient.

6. The system of claim 1, wherein the monitoring device comprises a respiration detection device configured to monitor a respiration motion of the patient.

7. The system of claim 6, wherein the respiration detection device comprises a closed tube equipped with a pressure sensor, the closed tube being operably coupled to at least one of the mouth or the nose of the patient.

8. The system of claim 1, wherein
  at least one of the one or more parameter values relates to an intrathoracic pressure of the patient, and
  the monitoring device comprises a pressure measurement device configured to measure the intrathoracic pressure of the patient.

9. The system of claim 8, wherein the pressure measurement device comprises a pressure sensor mounted on an esophageal balloon, the esophageal balloon being placed in the esophagus of the patient.

10. The system of claim 1, wherein
  at least one of the one or more parameter values relates to an afferent activity in one or more nerves associated with a respiration motion of the patient, and
  the monitoring device comprises a nerve monitoring device configured to monitor the afferent activity.

11. The system of claim 1, wherein
  at least one of the one or more parameter values relates to a blood gas level of the patient, and
  the monitoring device comprises an arterial blood sampling device configured to sample blood from the patient.

12. The system of claim 1, wherein
  at least one of the one or more parameter values relates to a hypercapnia level of the patient,
  the monitoring device comprises a brain blood volume measurement device, and
  acquiring one or more parameter values relating to the one or more status parameters that reflect the breath-hold status of the patient comprises:
    acquiring, using the brain blood volume measurement device, a brain blood volume of the patient; and
    estimating, based on the brain blood volume of the patient, the at least one parameter value relating to the hypercapnia level of the patient.

13. The system of claim 1, wherein
  at least one of the one or more parameter values relates to a heart rate of the patient, and
  the monitoring device comprises a heart rate measurement device.

14. The system of claim 1, wherein
  at least one of the one or more parameter values relates to a blood pressure of the patient, and
  the monitoring device comprises a blood pressure measurement device.

15. A method for patient monitoring implemented on a computing device having at least one processor and at least one storage device, the method comprising:
  obtaining experimental data relating to one or more test breath-holds of a patient, wherein the experimental data comprises motion data of a body surface of the patient;
  determining, based on the experimental data, one or more status parameters that reflect a breath-hold status of the patient;
  causing a medical device to perform a treatment or a scan on the patient who remains in the breath-hold status, wherein during the treatment or the scan of the patient,
    acquiring, using a monitoring device, one or more parameter values relating to the one or more status parameters that reflect the breath-hold status of the patient;
  predicting, based on the one or more parameter values, a breaking point of the breath-hold status at which the patient ceases the breath-hold status; and
  adjusting, based on the breaking point of the breath-hold status, the treatment or the scan, wherein the determining, based on the experimental data, one or more status parameters, comprises:
    determining, based on the motion data of the body surface of the patient, one or more leading regions associated with the breaking point, wherein each leading region is a region, the motion of which leads or indicates a coming cessation of the breath-hold status; and
    determining, based on the one or more leading regions, the one or more status parameters, at least one of the one or more status parameters relating to a motion of the one or more leading regions.

16. A non-transitory computer-readable storage medium including instructions that, when accessed by at least one processor of system for patient monitoring, causes the system to perform a method, the method comprising:
  obtaining experimental data relating to one or more test breath-holds of a patient, wherein the experimental data comprises motion data of a body surface of the patient;
  determining, based on the experimental data, one or more status parameters that reflect a breath-hold status of the patient;
  causing a medical device to perform a treatment or a scan on the patient who remains in the breath-hold status, wherein during the treatment or the scan of the patient;
    acquiring, using a monitoring device, one or more parameter values relating to the one or more status parameters that reflect the breath-hold status of the patient;
  predicting, based on the one or more parameter values, a breaking point of the breath-hold status at which the patient ceases the breath-hold status; and
  adjusting, based on the breaking point of the breath-hold status, the treatment or the scan, wherein the determining, based on the experimental data, one or more status parameters, comprises:
    determining, based on the motion data of the body surface of the patient, one or more leading regions associated with the breaking point, wherein each leading region is a region, the motion of which leads or indicates a coming cessation of the breath-hold status; and
    determining, based on the one or more leading regions, the one or more status parameters, at least one of the one or more status parameters relating to a motion of the one or more leading regions.

17. The system of claim 1, wherein the predicting a breaking point of the breath-hold status based on the one or more parameter values, comprises:

for each of the one or more status parameters,
  determining, based on the parameter value of the status parameter, whether the status parameter has a preset tendency or whether the parameter value of the status parameter is within a preset range; and
  determining the breaking point based on a determination result of whether the status parameter has the specific tendency or whether the parameter value of the status parameter is within a preset range.

18. The method of claim 1, wherein the one or more parameter values relate to at least one of an afferent activity in one or more nerves associated with a respiration motion of the patient, a blood gas level of the patient, or a hypercapnia level of the patient.

* * * * *